July 17, 1956  D. GIACOSA  2,755,100

REAR SUSPENSION FOR MOTOR VEHICLES

Filed June 27, 1950

INVENTOR.
DANTE GIACOSA

BY

ATTORNEY

United States Patent Office 2,755,100
Patented July 17, 1956

2,755,100

REAR SUSPENSION FOR MOTOR VEHICLES

Dante Giacosa, Turin, Italy, assignor to
Fiat S. p. A., Turin, Italy

Application June 27, 1950, Serial No. 170,616

Claims priority, application Italy June 30, 1949

2 Claims. (Cl. 280—124)

This invention relates to a rear motor vehicle suspension of the type disclosed in my U. S. patent application Serial No. 42,157, now Patent 2,582,775, and comprises spring means, longitudinal struts, and a cross assembly. The deformations of the cross assembly assist the spring means in stiffening the suspension as the vertical displacements of the driven axle increase, while the reaction to slight displacements is soft, being due solely to the spring means.

It is an object of this invention to obviate the difficulties due to unavoidable deformations in the heat treatment of cross bars formed from one piece by providing a cross assembly formed from two sections, each of which is secured at one end to the rear axle and at its other end to the vehicle frame.

A further object of this invention is to provide cross assembly sections, each of which consists of two elements slidable telescopically one within the other against the action of resilient means, one of the end attaching means being provided with means for length adjustment.

With this construction it is possible to adapt the cross assembly sections to the motor vehicle in a quick and accurate manner, even in the case of slight differences between the positions of the attachments with respect to those provided by the manufacturer, without impairing the advantages afforded by the cross assembly, namely a suspension having a variable flexibility characteristic.

A further object of this invention is to make up the cross assembly by two symmetrical sections which are connected at one of their ends to the driven axle and at their other ends to the frame. In one disclosed embodiment of the invention the two inner ends of the sections are keyed to a sleeve provided centrally with a circular flange. In such embodiment the connection between the sleeve and driven axle is effected through the interposition of rubber elements compressed between sheet metal casings and provided with surfaces facing both faces of the flange carried by the sleeve.

The cross assembly sections are keyed at their opposite ends within a spherical member mounted for rotation in a support, which is connected in turn to the frame through the interposition of rubber elements also enclosed within sheet metal casings.

Further features and advantages of the invention will be obvious from the specification taken with the accompanying drawings, in which.

Figure 1:
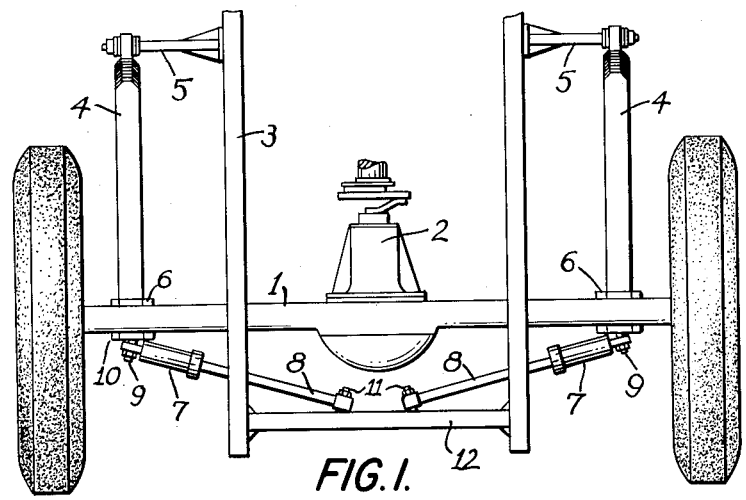
Figure 1 is a diagrammatic plan view of the rear driven axle of a motor vehicle provided with the suspension system according to this invention.

Referring to Figure 1, 1 denotes the driven axle, and 2 denotes the casing for the differential gear carried by the driven axle.

3 denotes the frame carrying two semi-elliptical springs 4 forming the longitudinal struts by means of two standards 5.

The other ends of the springs 4 are attached to two sleeves 6 carried by the driven axle.

The transverse connection between the driven axle and frame is effected by means of two arms each consisting of two elements 7, 8 sliding telescopically with respect to each other against the action of resilient means.

The element 7, which is in the form of a tubular sheath having a closed end, is articulated to a pivot 9 secured to a support 10 carried by the driven axle, and the element 8 is articulated to a pivot 11 secured to a cross member 12 of the frame.

Figure 2:
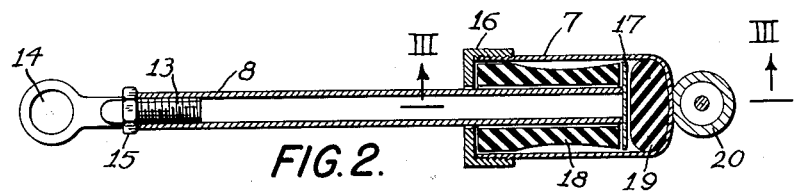
Figure 2 is a longitudinal section of one of the cross arms connecting the driven axle to the frame.
Figure 3:
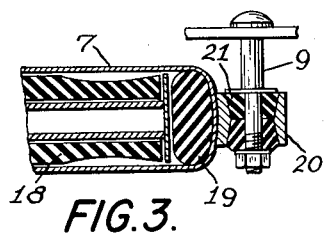
Figure 3 is a section on line III—III of Figure 2.

In Figures 2 and 3, 13 denotes a bolt screwed to the element 8, ending in an eye 14 and retained by a nut 15. The element 8 is guided within the element 7 by a cover 16 and has welded to its top a disc 17.

A rubber bushing 18 is interposed in the casing 7 between the disc 17 and cover 16, its outer surface being in contact with the casing 7 at its ends only in the neutral condition. Consequently, when the rod 9 and casing 7 undergo a relative axial displacement which tends to draw them apart, the bushing 18 is resiliently compressed by the disc 17 against the base 16, expanding radially until its outer surface fully comes into contact with the casing 7, preventing further relative displacements of the two elements 7, 8. A rubber bushing 19 is interposed between the disc 17 and base of the casing 7 and serves to damp the return stroke of the element 8.

An eyelet 20 is welded externally to the element 7 and has fixed thereto the pin 9 for connection to the driven axle through the interposition of a rubber sleeve 21.

Figure 4:
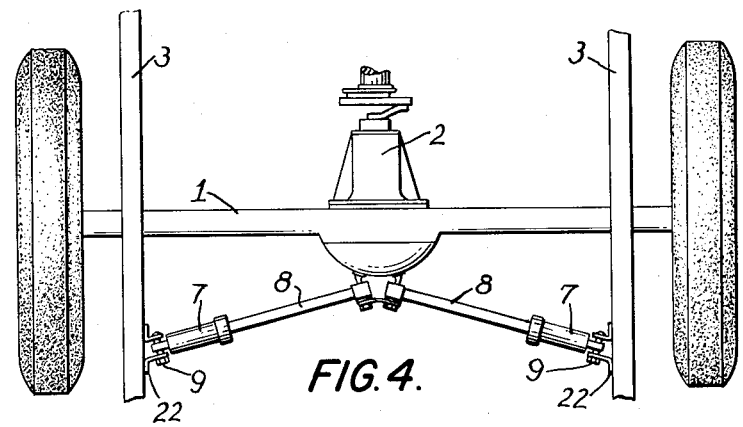
Figure 4 is a view similar to Figure 1 of another embodiment.

In the modification shown in Figure 4, in which the springs 4 are covered by the frame 3, the arrangement of the cross arms has been reversed, more particularly the elements 7 are connected to the frame 3 by means of angle irons 22 supporting the pivots 9, and the elements 8 are connected to the differential gear casing 2 carried by the driven axle.

What I claim is:

1. In a motor vehicle having a frame, a rear axle, a spring suspension system for said rear axle, longitudinal leaf spring struts articulated at one end to the frame and at the other end to the rear axle, and a resilient cross assembly providing transverse anchoring means between the axle and frame, said assembly comprising two sections and each of said sections comprising a tubular member, a disc carried at one end of the tubular member, a sheath receiving the end of the tubular member carrying the disc in a telescopically movable relationship, an eye carried by the sheath and an eye carried by the end of the tubular member outside the sheath, said eyes adapted to anchor opposite ends of each section to the frame and axle respectively, a rubber pad disposed between the bottom of said sheath and the disc and a rubber sleeve carried on said tubular member between said disc and the other end of the sheath, whereby the flexibility of the entire suspension is progressively reduced as the extent of displacement of the rear axle relatively to the frame increases.

2. A motor vehicle as defined in claim 1, wherein the outer surface of said rubber sleeve engages the sheath wall at its ends only when the tubular member and the sheath are in neutral position, whereby when the tubular member and sheath tend to draw apart, said rubber sleeve is compressed and expands in a radial direction until its outer surface fully engages the sheath wall, preventing further relative displacement of the member and the sheath.

References Cited in the file of this patent

UNITED STATES PATENTS

| | | |
|---|---|---|
| 1,388,389 | Tamura et al. | Aug. 23, 1921 |
| 1,406,935 | Crane | Feb. 14, 1922 |
| 1,703,592 | Paton | Feb. 26, 1929 |
| 1,864,080 | Madge | June 21, 1932 |
| 1,970,859 | Lenz | Aug. 21, 1934 |
| 2,132,963 | Nallinger | Oct. 11, 1938 |
| 2,159,203 | Chayne | May 23, 1939 |
| 2,218,634 | Best | Oct. 22, 1940 |
| 2,338,921 | Fiedler | Jan. 11, 1944 |
| 2,393,183 | Parker | Jan. 15, 1946 |
| 2,507,656 | Wicks | May 16, 1950 |
| 2,582,775 | Giacosa | Jan. 15, 1952 |

FOREIGN PATENTS

| | | |
|---|---|---|
| 17,821 of 1909 | Great Britain | Dec. 9, 1909 |
| 252,661 | Italy | Oct. 2, 1926 |